United States Patent
Maruyama et al.

(10) Patent No.: US 9,704,040 B2
(45) Date of Patent: Jul. 11, 2017

(54) IMAGE PROCESSING APPARATUS FOR DIVIDING AN IMAGE BASED ON MARKERS, METHOD THEREOF AND PROGRAM THEREFOR

(71) Applicant: KABUSHIKI KAISHA TOSHIBA, Tokyo (JP)

(72) Inventors: Masayuki Maruyama, Tokyo-to (JP); Osamu Yamaguchi, Yokohama (JP); Mayumi Yuasa, Tokyo-to (JP); Tatsuo Kozakaya, Kawasaki (JP); Tomokazu Kawahara, Yokohama (JP); Quoc Viet Pham, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/661,360

(22) Filed: Mar. 18, 2015

(65) Prior Publication Data
US 2015/0269437 A1    Sep. 24, 2015

(30) Foreign Application Priority Data
Mar. 19, 2014 (JP) ................ 2014-056764

(51) Int. Cl.
G06K 9/00 (2006.01)
G06K 9/20 (2006.01)
G06K 9/32 (2006.01)

(52) U.S. Cl.
CPC ....... *G06K 9/00624* (2013.01); *G06K 9/2063* (2013.01); *G06K 2009/3225* (2013.01)

(58) Field of Classification Search
None
See application file for complete search history.

(56) References Cited

FOREIGN PATENT DOCUMENTS

| JP | 1997-120331 | 5/1997 |
| JP | 2001-145092 | 5/2001 |
| JP | 2001-204007 | 7/2001 |
| JP | 2008-242512 | 10/2008 |
| JP | 2009-146176 | 7/2009 |
| JP | 2010-062596 | 3/2010 |

OTHER PUBLICATIONS

Machine translation of JPN 2001-145092 (IDS submission).*

* cited by examiner

*Primary Examiner* — Atiba O Fitzpatrick
(74) *Attorney, Agent, or Firm* — Nixon & Vanderhye, P.C.

(57) ABSTRACT

An image processing method includes: retaining marker information including markers, each of the markers having a type which is shape, pattern or color; acquiring images in which at least one of the markers is caught; referring the marker information to detect the type and a position of the marker caught in the image; and dividing the image into a plurality of divided areas on the basis of the positions of one or more markers in the image, the plurality of divided areas having no common area and each including at least one type of the marker.

19 Claims, 13 Drawing Sheets

IMAGE PROCESSING APPARATUS FOR DIVIDING AN IMAGE BASED ON MARKERS, METHOD THEREOF AND PROGRAM THEREFOR

CROSS-REFERENCE TO RELATED APPLICATIONS

This application is based upon and claims the benefit of priority from the prior Japanese Patent Application No. 2014-56764, filed on Mar. 19, 2014; the entire contents of which are incorporated herein by reference.

FIELD

The present invention relates to an image processing apparatus, a method thereof, and a program therefor.

BACKGROUND

In the related art, in the field of security and facility, a system configured to detect abnormality automatically within visual fields of a number of cameras installed on site without depending on visual judgment of person by processing images shot by these cameras is known.

In order to reduce the amount of computation in processing of the images, or in order to process only within target areas, there is a method in which a user sets areas on the basis of markers.

However, the user uses an input device such as a keyboard, a mouse, a digitizer pen, and a touch pad in order to set the areas. Therefore, there is a problem that the setting operation is complicated.

In view of such a problem, it is an object of the invention to provide an image processing apparatus which allows setting of areas without using an input device, a method thereof, and a program therefor.

DETAILED DESCRIPTION

According to embodiments, there is provided an image processing apparatus comprising: a marker retaining unit retaining marker information including markers, each of the markers having a type which is shape, pattern or color; an image acquiring unit configured to acquire images in which at least one of the markers is caught; a detection unit configured to refer the marker information to detect the type and a position of the marker caught in the image; and a dividing unit configured to divide the image into a plurality of divided areas on the basis of the positions of at least one or more of the markers in the image, the plurality of divided areas having no common area and each including at least one type of the marker.

An image processing apparatus 10 of embodiments of the invention will be described with reference to the drawings.

First Embodiment

The image processing apparatus 10 of a first embodiment will be described with reference to FIGS. 1 to 7.

Figure 1A:
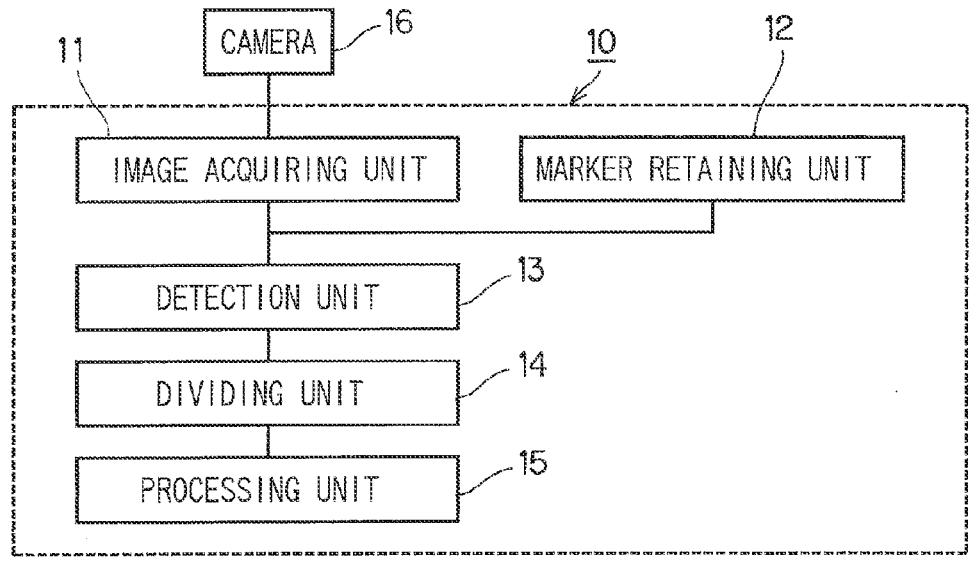
FIG. 1A is a block diagram of image processing apparatus of a first embodiment.

A configuration of the image processing apparatus 10 of this embodiment will be described with reference to a block diagram in FIG. 1A. As illustrated in FIG. 1A, the image processing apparatus 10 includes an image acquiring unit 11, a marker retaining unit 12, a detection unit 13, a dividing unit 14, and a processing unit 15, and a camera 16 and a recording apparatus are connected with or without wire.

The image acquiring unit 11 acquires an image from the camera 16 or a recording apparatus. The camera 16 shoots a marker presented on a board held by a worker on site. The recording apparatus memorizes images taken by the camera 16.

The marker retaining unit 12 acquires a marker used for detection and a processing method (processing program) corresponding to the marker from an outside by using network or a USB connecting device. The marker retaining unit 12 may memorize the marker and the processing method corresponding to the marker in advance.

The detection unit 13 detects whether or not the marker acquired by the marker retaining unit 12 remains in the image acquired by the image acquiring unit 11.

The dividing unit 14 divides the image into a plurality of areas on the basis of similarity selected in advance with reference to a type and a position of the marker detected by the detection unit 13. In other words, the dividing unit 14 divides the image into a plurality of areas having no area common to each other including at least one type of the marker on the basis of the positions of the images of at least one or more detected markers.

The processing unit 15 executes the processing method corresponding to the marker used for division on the respective divided areas divided by the dividing unit 14 from one divided area to another. This processing method is acquired from the marker retaining unit 12 as described above.

Figure 1B:
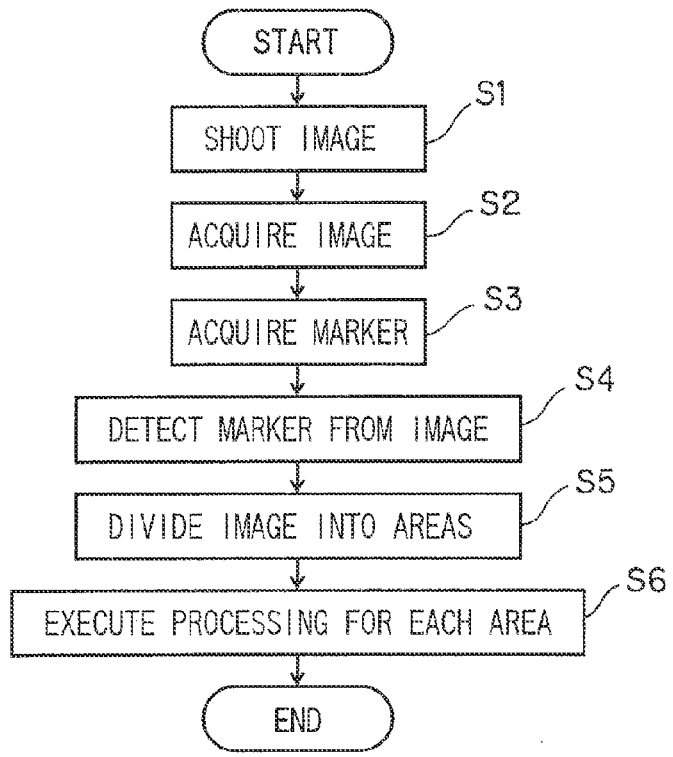
FIG. 1B is a flowchart of an operating state of the image processing apparatus.

Subsequently, an operating state of the image processing apparatus 10 will be described with reference to a flowchart illustrated in FIG. 1B.

In Step S1, the camera 16 shoots a marker at a specific position on site.

In Step S2, the image acquiring unit 11 acquires an image shot by the camera 16.

In Step S3, the marker retaining unit 12 acquires the marker used for detection and the processing method corresponding to the marker from the outside.

In Step S4, the detection unit 13 references the marker acquired by the marker retaining unit 12 and detects the type and the position of the marker from the image.

In Step S5, the dividing unit 14 divides the image into a plurality of areas on the basis of the type and the position of the detected marker. At this time, the dividing unit 14 divides the image into the plurality of areas so as to include only one type of markers in one area and not to have an area common to each other with reference to the similarity. Although one area includes only one type of markers, a plurality of markers may be included as long as they are the markers of the same type. The similarity is to be determined in advance.

In Step S6, the processing unit 15 calls up the processing method corresponding to each marker from the marker retaining unit 12, and executes the method from one divided area to another.

Accordingly, this method allows the worker to present a marker which matches a required processing method on site at a predetermined position, the camera 16 to shoot the marker, and the image processing apparatus 10 to divide the area in the image on the basis of the marker and execute a processing method predetermined for each divided area.

The image processing apparatus 10 of the embodiment allows the user to perform division of the area and setting of the processing method for each of the divided areas from instinctively on site without using the input device.

The term "image" means a sill image, or respective frames of a video image.

The term "marker" means marks whose type can be identified by two-dimensional or three-dimensional shape, pattern, or color and, in this embodiment, two-dimensional marks presented on a board and a circle mark, a cross mark, a triangular mark, and a square mark are included. The term "markers of the same type" means markers having the same shape, pattern, shape and pattern, shape and color, pattern and color, or shape and pattern and color, and the size of the marker may or may not be used for identification of the type.

The term "similarity" is a degree indicating how two given points (pixel position) on the image are similar by using a scale uniquely determined from a physical amount at the tow points (image coordinate value, luminance value, RGB value, luminance difference from peripheral pixels, and edge weight). The more the physical amount of two points are similar, the higher the similarity, and the less the physical amount of the two point are similar, the lower the similarity.

In the case that the physical amount is the image coordinate value, the scale of the similarity is a distance between two points (for example, Euclid distance, Manhattan distance, Chebyshev distance), and the similarity is an inverse of a value obtained by nth power of Euclid distance (where n is a natural number). For example, if there are two marker points A and B at which different markers A and B are placed respectively, a similarity R1 between the marker point A and a point C, which is at a given position different from the marker point A and the marker point B, (for example, R1 is an inverse of the distance between A and C), and a similarity R2 between the points B and C (for example, R2 is an inverse of the distance between B and C) are obtained and compared, and which areas of the marker point A and the marker point B the given point C is included in is determined. At this time, if the similarity R1 between A and C is larger than the similarity R2 between B and C, the given point C is included in the area of the marker point A. Therefore, the dividing unit 14 divides the image so that the given point C is included in the marker A. The marker point is an image coordinate value of a center point of an area where the marker appears, or an image coordinate value of a point of center of gravity thereof. This method allows calculation of a boundary line of the divided areas, and is specifically effective in the case where there is no difference in luminance value and RGB value between peripheries of the two marker points. Specifically, the distance between the marker point A and the marker point B is obtained, and the area is divided by a line at the same distance from the marker point A and the marker point B (a line where the similarity of the two marker points A and B is the same) as a boundary line.

In the case where there are differences in the luminance value and the RGB value between the peripheries of the two marker points and the luminance value or the RGB value is used as the physical amount for obtaining the similarity, the amount of change in luminance value or in RGB value is used as the scale of the similarity, and an inverse of the amount of change is used as the similarity.

In the case where the value of the edge weight is used as the scale of the similarity is used, an inverse of a cost alleviation (energy) by edge cutting is used as the similarity and the dividing unit 14 divides the area by graph-cut.

In the case where a value of luminance gradient as the scale of the similarity is used, a value obtained by Watershed method may be used as the similarity, and the dividing unit 14 divides the area by the obtained value.

In the case where the type or the position of the marker appearing in the image is found by a different process or prior information, the distance between the markers is obtained by using a geodesic distance, so that the dividing unit 14 can divide the area by a line at the same distance from the respective markers as a boundary line in the same manner as the case of the Euclid distance.

A configuration in which the type of the similarity as described above is not determined in advance, but the gradient amount of the luminance values or the RGB values in the peripheries of the markers are obtained, and the dividing unit 14 changes the type of the similarity as needed in accordance with the position of the marker on the image is also applicable.

Subsequently, an application example 1 of the image processing apparatus 10 will be described with reference to FIGS. 2 to 7. The application example 1 is a case where the image processing apparatus 10 is used for a security field, and is used for detecting an intruder climbing over a fence.

Figure 2:
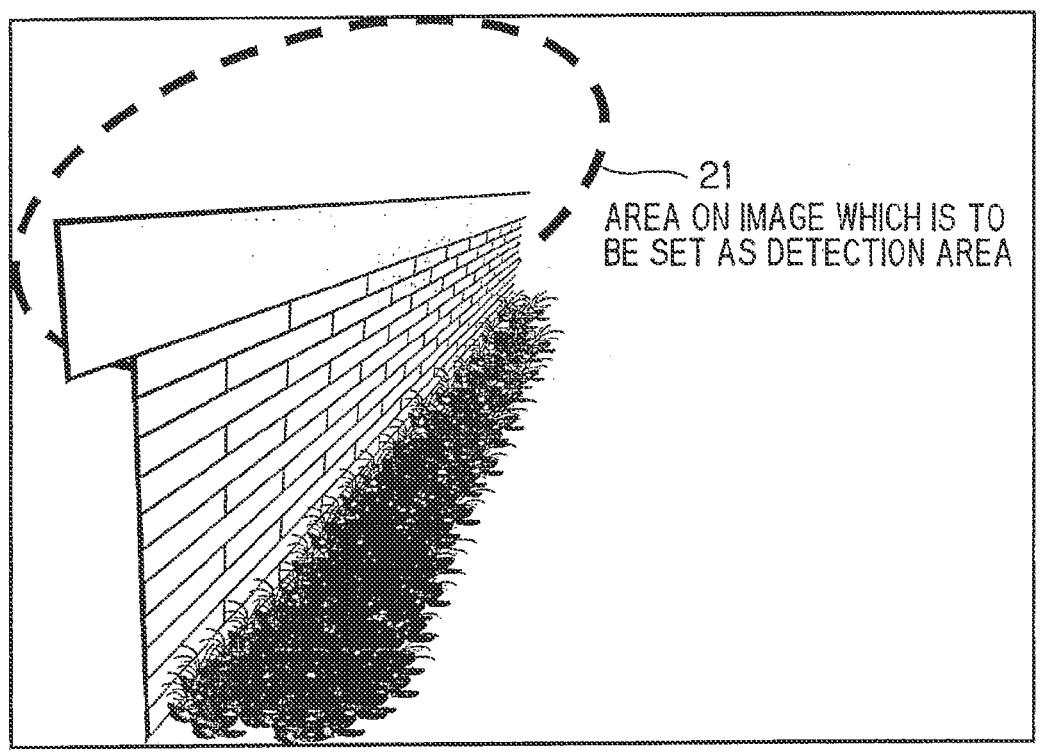
FIG. 2 is an image drawing illustrating a state in which a fence is shot from a premise inside the fence in an application example 1.

The camera 16 shoots the fence from premises within the fence as illustrated in FIG. 2, and the image acquiring unit 11 acquires an image shot by the camera 16. The intruder climbing over the fence always appears in the periphery of the fence. There is a case where a person allowed to enter the premises approaches the fence and is caught in the image inside the fence. However, such a person does not climb over the fence in normal cases. Therefore, in order to detect only the intruders who climbs over the fence, the image processing apparatus 10 sets the area above the fence as a detection area 21 as illustrated in FIG. 2, and sets an area below as a non-detection area.

Figure 3:
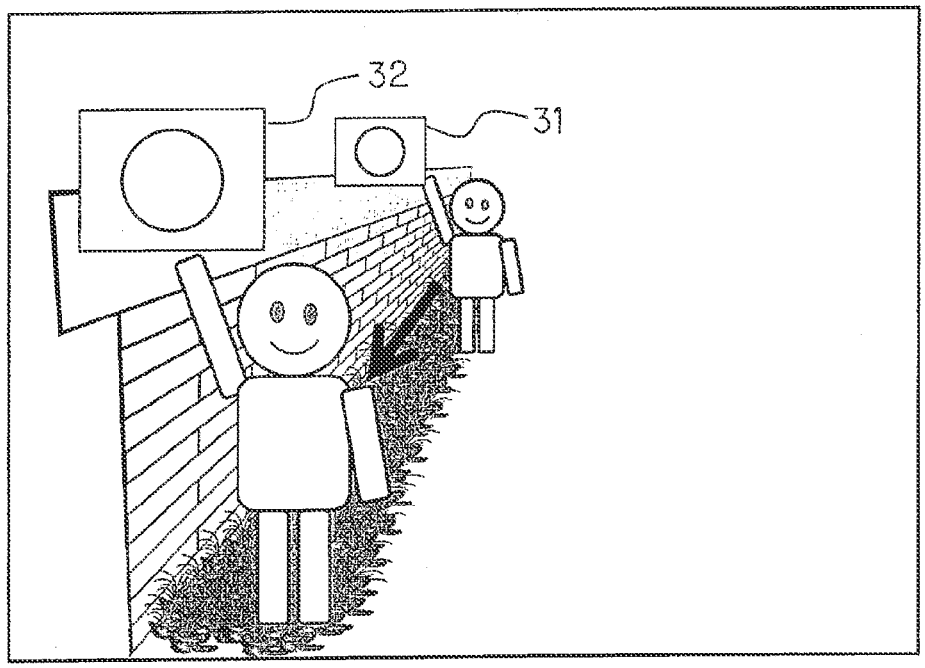
FIG. 3 is an image drawing showing a state in which markers corresponding to a detection area are upheld so as to be caught by a camera 16 in an image of the detection area of the camera 16.

As illustrated in FIG. 3, the workers present boards having circular markers 31 and 32 thereon so as to be included in the detection area 21, and the camera 16 shoots an image including the markers 31 and 32. The camera 16 may shoot the plurality of markers as a still image simultaneously. However, if the camera 16 has a function to shoot a movie image, the camera 16 shoots an image of the worker moving a single marker from a position 31 to a position 32 in sequence.

Subsequently, the image acquiring unit 11 acquires the image.

Subsequently, the marker retaining unit 12 acquires marker information including a circular marker and an intruder detection processing method from the outside. The intruder detection processing method corresponds to the circular marker and means an intruder detection processing program for detecting an intruder in the detection area.

Subsequently, the detection unit 13 detects the circular markers acquired by the marker retaining unit 12 from the image acquired by the image acquiring unit 11. The processing unit 15 records and saves the types of the detected markers and the positions on the image. For simplifying description below, the circle mark is assumed to be shot at two positions, the position 31 and the position 32 in FIG. 3.

Figure 4:
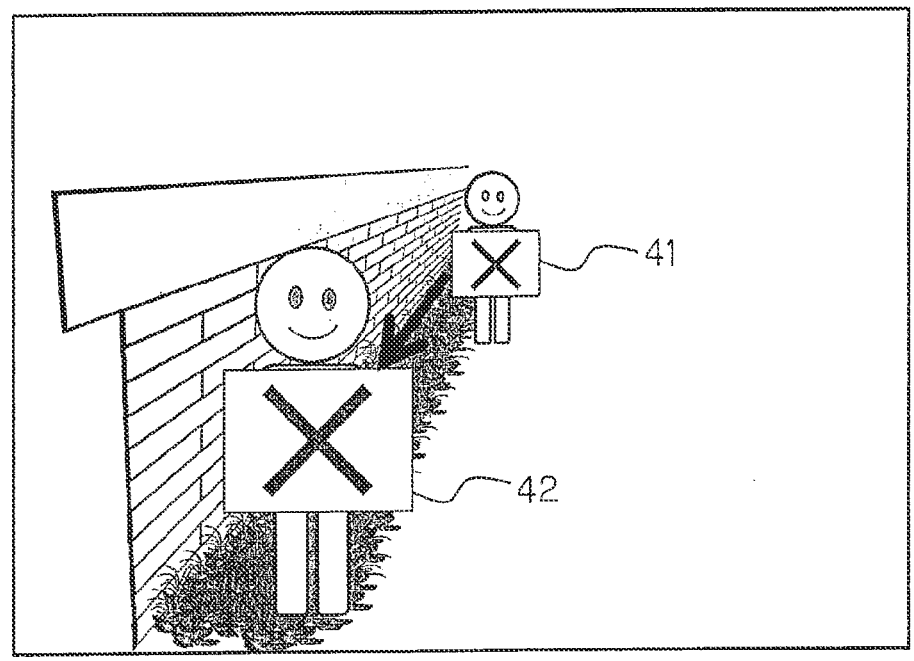
FIG. 4 is an image drawing showing a state in which markers corresponding to a non-detection area are upheld so as to be caught by the camera 16 in an image of the non-detection area of the camera 16.

Subsequently, as illustrated in FIG. 4, the workers present boards having a cross markers 41 and 42 thereon so as to be included in the non-detection area, and the camera 16 shoots an image including the markers 41 and 42, and the image acquiring unit 11 acquires the image. The camera 16 may shoot the plurality of markers as a still image simultaneously. However, if the camera 16 has a function to shoot a movie image, the camera 16 shoots an image by moving a single marker from a position 41 to a position 42 in sequence.

Subsequently, the marker retaining unit 12 acquires the marker information of the cross markers and a processing method, in which a detection process is not performed in a non-detection areas corresponding to the cross markers (non-detection processing program).

Subsequently, the detection unit 13 detects the cross markers acquired by the marker retaining unit 12 from the image acquired by the image acquiring unit 11. The processing unit 15 records and saves the types of the detected markers and the positions on the image. For simplifying description below, the cross mark is assumed to be shot at two positions, the position 41 and the position 42.

Figure 5:
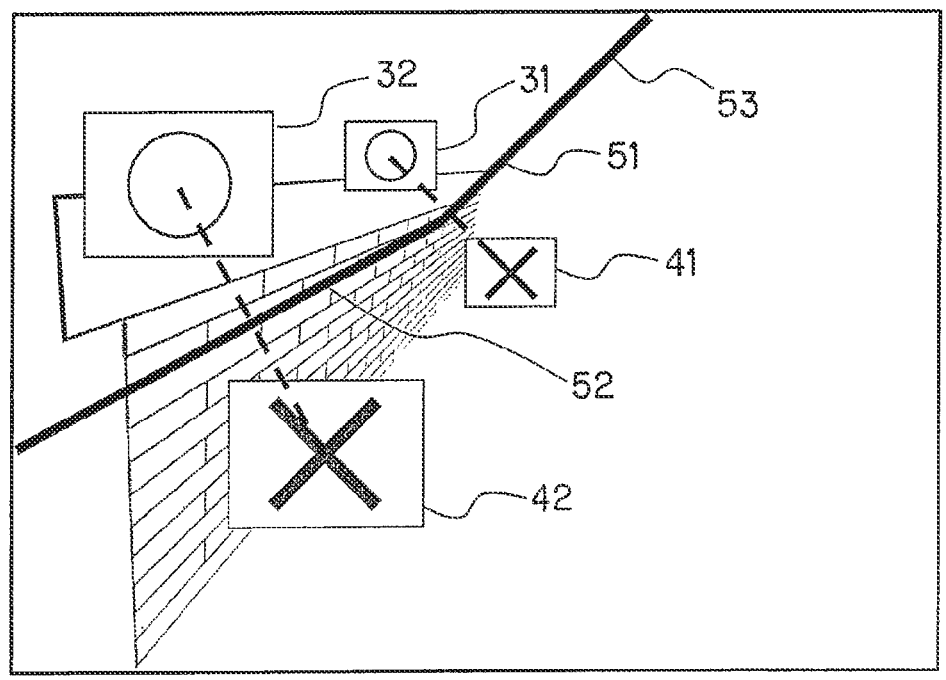
FIG. 5 is an image drawing illustrating combinations of the respective markers and an example of an area dividing process.

Subsequently, the dividing unit 14 selects markers having different types from each other but located at the positions closest to each other from the respective markers detected from the image and pairs as one set. As illustrated in FIG. 5, the dividing unit 14 selects a cross mark at the position 41 as a marker having a different type from the circle mark at the position 31 but located at the closest position and in the same manner, a cross mark at the position 42 is selected for the circle mark at the position 32, a circle mark at the position 31 is selected for the cross mark at the position 41, and the circle mark at the position 32 is selected for the cross mark at the position 42. Therefore, as illustrated in FIG. 5, the dividing unit 14 combines the circle marker at the position 31 and the cross marker at the position 41, and the circular marker at the position 32 and the cross marker at the position 42, in totally into two pairs.

Subsequently, the dividing unit 14 obtains which marker an area between the markers in each of the pairs is close to is obtained and performs the area division. For example, as illustrated in FIG. 5, in the case where the similarity is selected to be an inverse of Euclid distance in advance, the dividing unit 14 sets a straight line 53 obtained by combining a perpendicular bisector 51 of a shortest distance between the position 31 and the position 41 and a perpendicular bisector 52 of a shortest distance between the position 32 and the position 42 as a boundary of the area division. Accordingly, as illustrated in FIG. 6, the dividing unit 14 obtains a detection area 61 and a non-detection area 62 in the image.

Figure 6:
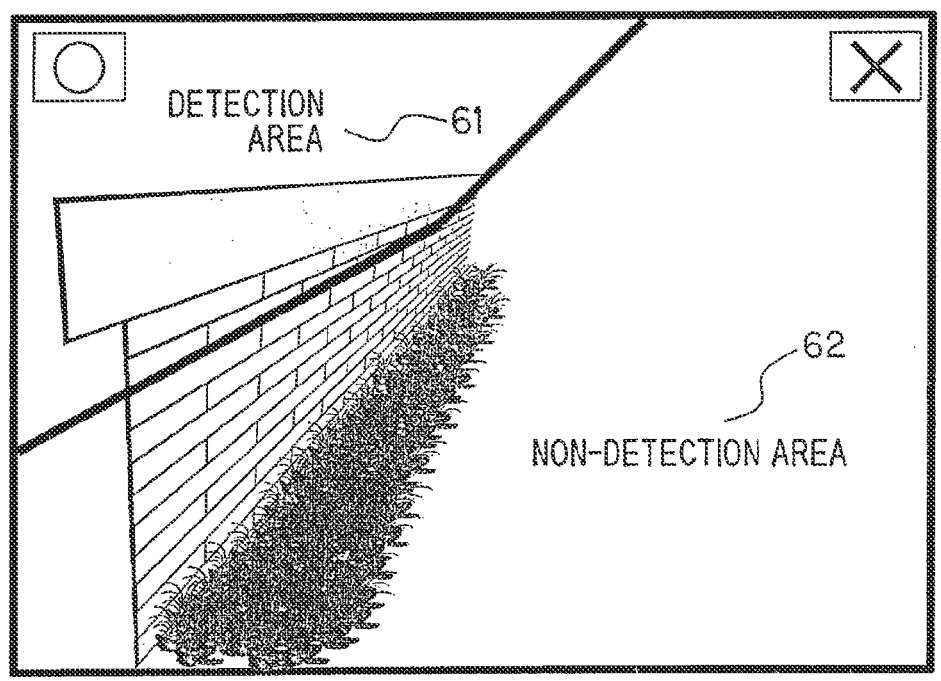
FIG. 6 is an image drawing illustrating a result of an example of area division in a case of an intruder detection.
Figure 7:
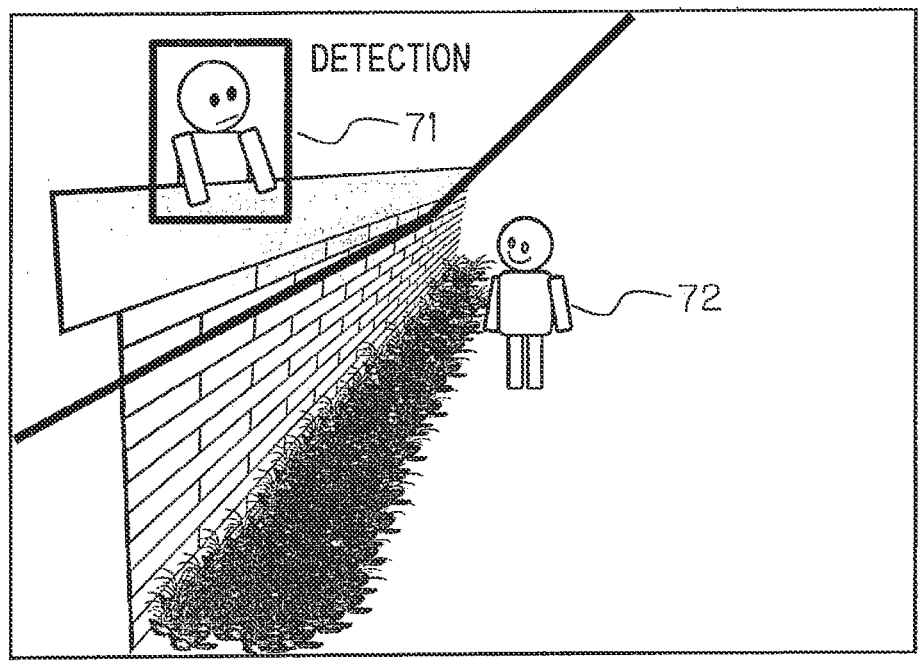
FIG. 7 is an image drawing illustrating an example of the intruder detection on the basis of the area division.

As illustrated in FIG. 6, the processing unit 15 performs an intruder detection processing for the detection area 61 corresponding to the circular marker and does not perform the intruder detection processing for the non-detection area 62 corresponding to the cross marker. As a result, as illustrated in FIG. 7, the image processing apparatus 10 detects a person 71 who has climbed over the fence as an intruder, and does not detect a person 72 walking inside the fence.

Second Embodiment

In the second embodiment, an application example 2 of the image processing apparatus 10 described in the first embodiment will be described with reference to FIG. 8 to FIG. 12. The application example 2 is the case where the image processing apparatus 10 is used in a facility field, and is the case where the image processing apparatus 10 is used in monitoring a parking and introducing vehicles. The image processing apparatus 10 used in the application example 1 may be applied to the application example 2 by replacing the marker and the processing method acquired by the marker retaining unit 14 in the application example 1 with marker information corresponding to the application example 2.

A first object of monitoring the parking in the facility field is to detect the position of a vacant parking space.

A second object is to detect that a vehicle is parked in a parking space for disabled for encouraging staff to go for assistance. In order to achieve the first and second objects, the image processing apparatus 10 needs to detect the position where the vehicle has stopped and vacant spaces in the parking space. Therefore, the area needs to be divided for each parking space.

Figure 8:
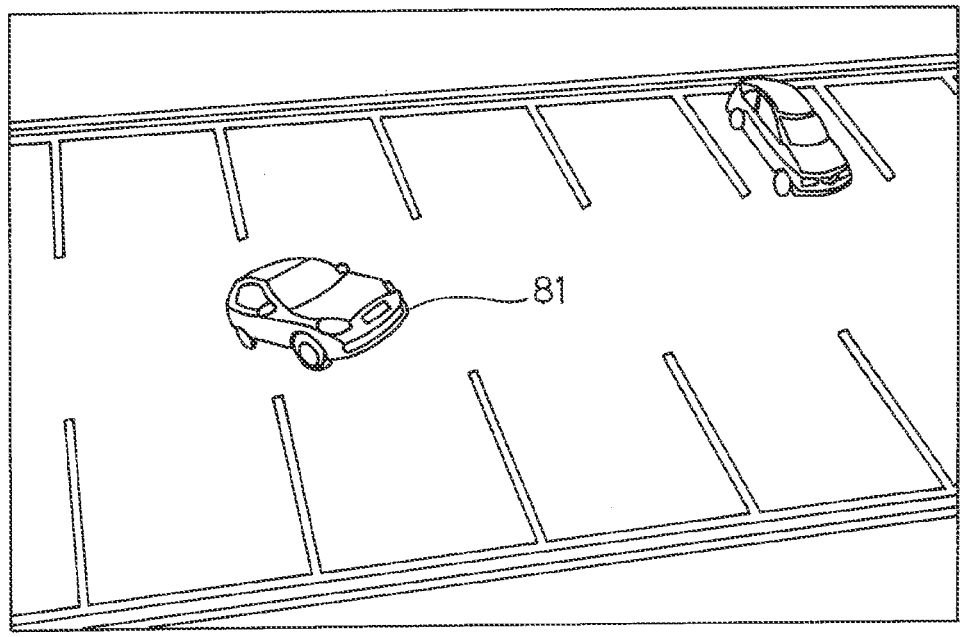
FIG. 8 is an image drawing illustrating a state of monitoring a parking in an application example 2 of a second embodiment.

A third object is to find a vehicle 81 being stopped in a traffic area as illustrated in FIG. 8 and encourage the staff to cope with a rule that the vehicles are not allowed to be stopped in the traffic area more than a certain period, which is set up in advance.

Figure 9:
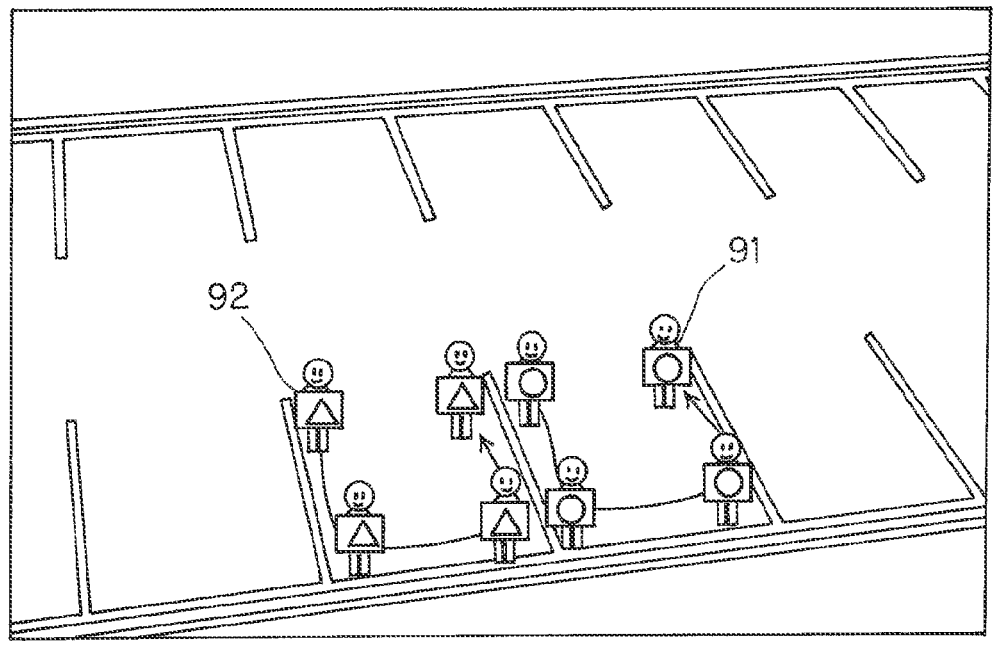
FIG. 9 is an image drawing showing a state in which markers corresponding to respective parking spaces are upheld so as to be caught by the respective parking spaces of an image.

As regards the parking space, as illustrated in FIG. 9, the worker arranges the adjacent parking spaces so as to surround with a circular marker 91 and a triangular marker 92 alternately so as to prevent the areas from being joined.

Figure 10:
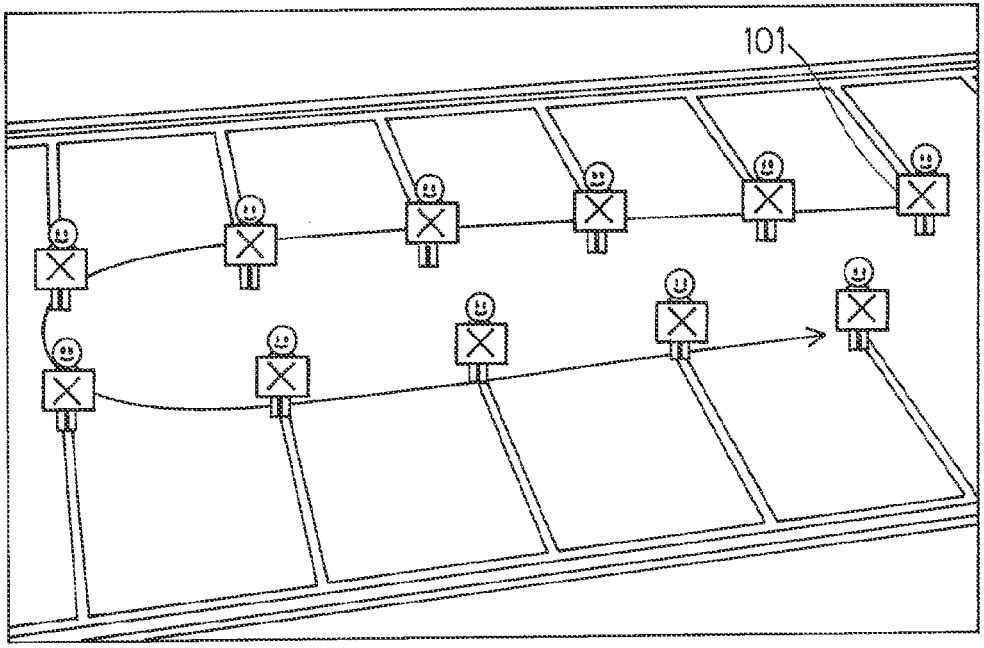
FIG. 10 is an image drawing showing a state in which markers corresponding to a traffic area are upheld so as to be caught by the camera 16 in an image of the traffic area of the camera 16.

As regards the traffic area, as illustrated in FIG. 10, the worker arranges cross markers 101 so as to go round the traffic area.

First of all, the camera 16 shoots an image of the parking illustrated in FIG. 9 and FIG. 10. When shooting the markers, the camera 16 may shoot a plurality of the markers simultaneously as a still image, or may shoot an image of the worker moving a single marker in sequence as a movie image in the same manner as the application example 1.

Subsequently, the image acquiring unit 11 acquires the image.

Subsequently, the marker retaining unit 12 acquires marker information including the circular markers, triangular markers, and a notification processing method thereof, and a cross markers and an alarm processing method thereof from the outside. The notification processing method corresponds to the circular and triangular markers, and means a notification processing program for notifying the presence or absence of parked vehicles in the respective parking spaces. The alarm processing method corresponds to the cross markers and means an alarm processing program for issuing an alarm when a vehicle stopping in the traffic area is detected.

Subsequently, the detection unit 13 detects the markers acquired by the marker retaining unit 12 from the image acquired by the image acquiring unit 11.

Subsequently, the dividing unit 14 selects markers having different types from each other but located at the positions closest to each other from the respective markers detected by the detection unit 13 and pairs as one set in the same manner as the application example 1, and then obtains which marker an area between the markers in each of the pairs is close to is obtained and performs the area division. The dividing unit 14 obtains parking space areas 121 and 122 and a traffic area 123 by the area division as illustrated in FIG. 12.

Figure 12:
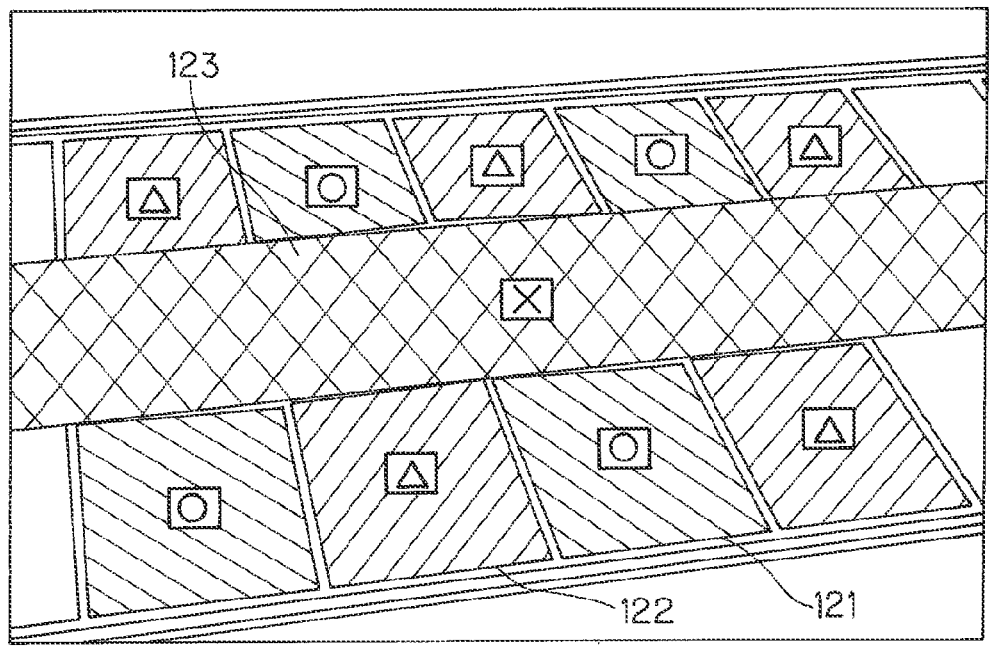
FIG. 12 is an image drawing illustrating an example of a result of an area division in a parking monitoring.

Subsequently, as illustrated in FIG. 12, the processing unit 15 detects the presence or absence of the vehicle by using the notification processing method in the parking space areas 121 and 122 corresponding to the circular marker and the triangular markers, and notifies vacant parking spaces to an administrator or to a driver looking for a parking space, and notifies the administrator to go to help if there is a vehicle parked in the parking space for disabled.

If the processing unit 15 detects a vehicle stopping in the traffic area 123, which corresponds to the cross marker by using the alarm processing method, for more than a predetermined period, the processing unit 15 issues an alarm to the administrator because traffic of other vehicles may be hindered and the corresponding vehicle may be subjected to an accident.

Figure 11:
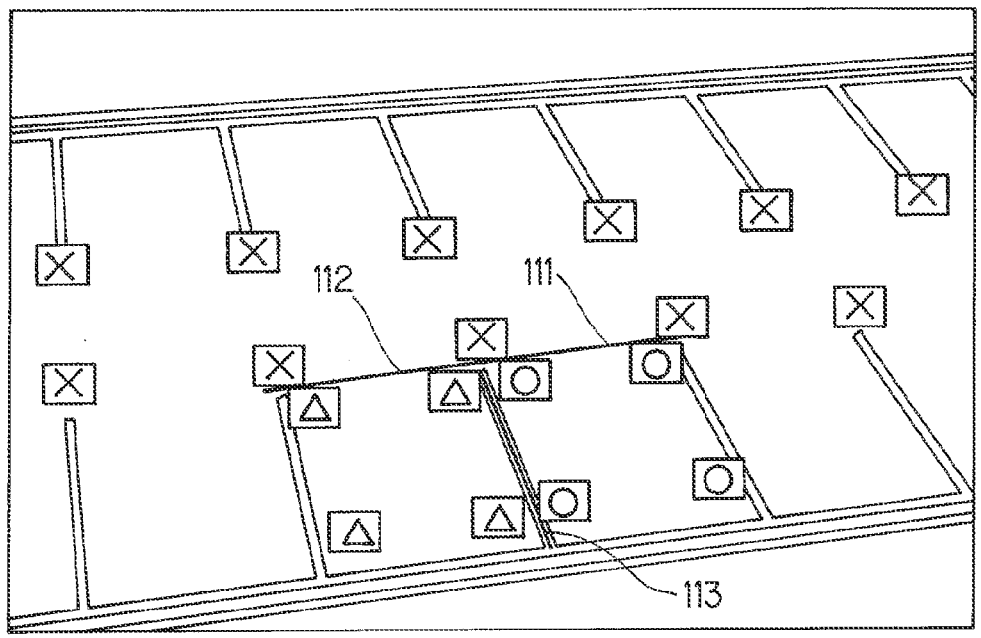
FIG. 11 is an image drawing illustrating an example of an area division process in a parking monitoring.

A modification of a method of the area division of the dividing unit 14 will be described with reference to FIG. 11. As illustrated in FIG. 11, the area is divided by focusing on the luminance values or the presence or absence of a change in color between the markers in pairs. For example, there is a white line between the circular marker and the triangular marker, where an edge 113 having strong pixels exists. The dividing unit 14 does not set the similarity used for the area division in advance, but detects the edge characteristic existing between the markers from the image after the markers have been shot, selects the edge weight of the pixels as the similarity, and obtains a boundary line 113 of the area by graph-cut. At this time, the boundary of the adjacent areas corresponds to the edge 113. However, like the boundary lines 111 and 112 illustrated in FIG. 11, there is a uniform road surface having no change in luminance and color between the circular marker and the cross marker or between the triangular marker and the cross marker. The dividing unit 14 obtains the boundary lines 111 and 112 by changing the scale of the similarity to the Euclid distance as described above or the geodesic distance if the fact that luminance information, color information, edge strength, and luminance gradient cannot be used as the similarity is found from the image.

Third Embodiment

In a third embodiment, an application example 3 of the image processing apparatus 10 described in the first embodiment will be described with reference to FIG. 13 to FIG. 16. The application example 3 is the case where the image processing apparatus 10 is used in a facility field, and is the case where the image processing apparatus 10 is used in air conditioning control in an office. The image processing apparatus 10 used in the application example 1 may be applied to the application example 3 by replacing the marker and the processing method acquired by the marker retaining unit 14 in the application example 1 with marker information corresponding to the application example 3.

Figure 13:
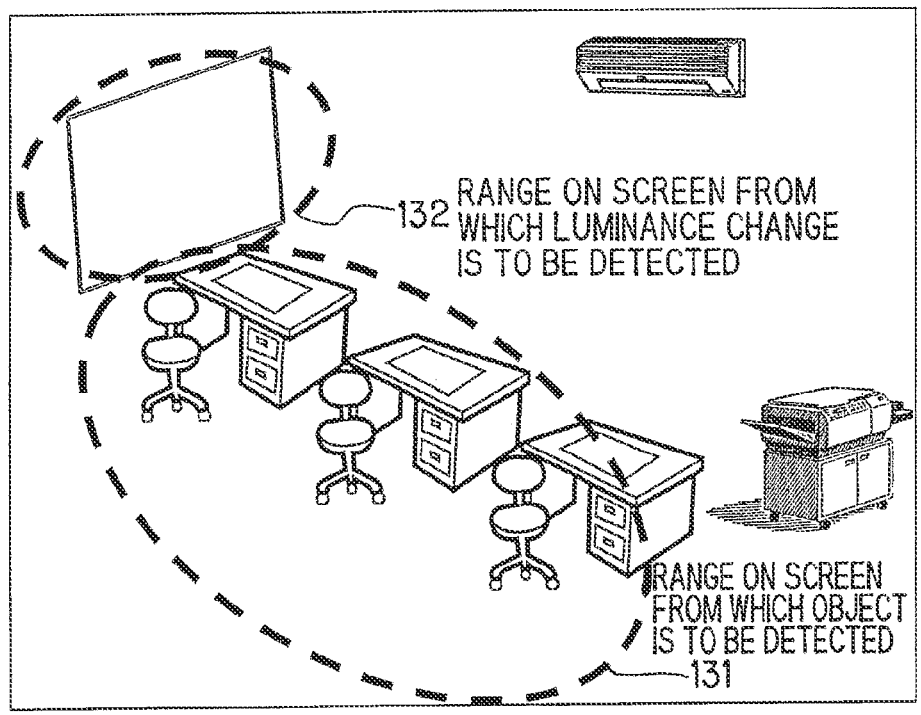
FIG. 13 is an image drawing of the case of being used in an air-conditioning control in an office of an application example 3 of a third embodiment.

Air conditioning control improves comfort by enhancing conditioning of an air conditioner in an area where a number of persons exist, or sending wind from the air conditioner toward the area. In contrast, it is an object to restrain waste of energy consumption by weakening or stopping the air conditioning if no person exists or if existence of the person is temporal. Therefore, as illustrated in FIG. 13, the person is detected in an area 131 in the periphery of a desk where the person stays for a long time for work, but persons in other areas are not detected. If sunshine enters from a window, the temperature in the room rises. Therefore, a change in luminance of an area near window 132 is also detected and if there is sunshine and hence the luminance is increased, a temperature setting for warming and a temperature setting for cooling are lowered.

Figure 14:
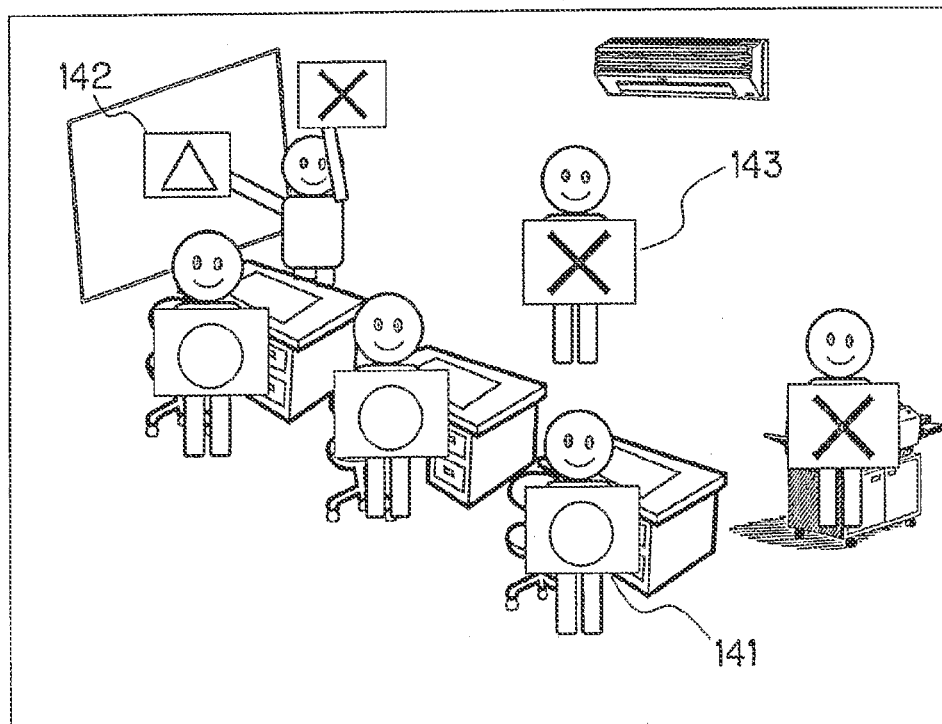
FIG. 14 is an image drawing in which workers present markers in an office.

The camera 16 shoots markers 141, 142, and 143 held by the workers in the office to be air conditioned as illustrated in FIG. 14, and the image acquiring unit 11 acquires the image.

Subsequently, the marker retaining unit 12 acquires the circular marker 141, the triangular marker 142, and the cross marker 143 as marker information as illustrated in FIG. 14. The marker information acquired by the marker retaining unit includes the following processing method. A first processing method corresponding to the circular marker 141 outputs an air-conditioning control signal to an air-conditioning control apparatus so as to strengthen the air conditioning by the air conditioner when a person enters a person detection area, and weaken the air conditioning of the air conditioner when no person is present (a first air-conditioning control program). A second processing method corresponding to the triangular marker 142 outputs an air-conditioning control signal to an air-conditioning control apparatus so as to strengthen the air conditioning by the air conditioner when the luminance caused by the sunshine in a luminance change detection area increases, and weaken the air conditioning of the air conditioner when the luminance is lowered (a second air-conditioning control program). A third processing method corresponding to the cross marker 143 outputs an air-conditioning control signal for weakening or stopping the air conditioning of the air conditioner if a person 163 stands in front of a copying machine located in the non-detection area to an air-conditioning control apparatus.

Figure 15:
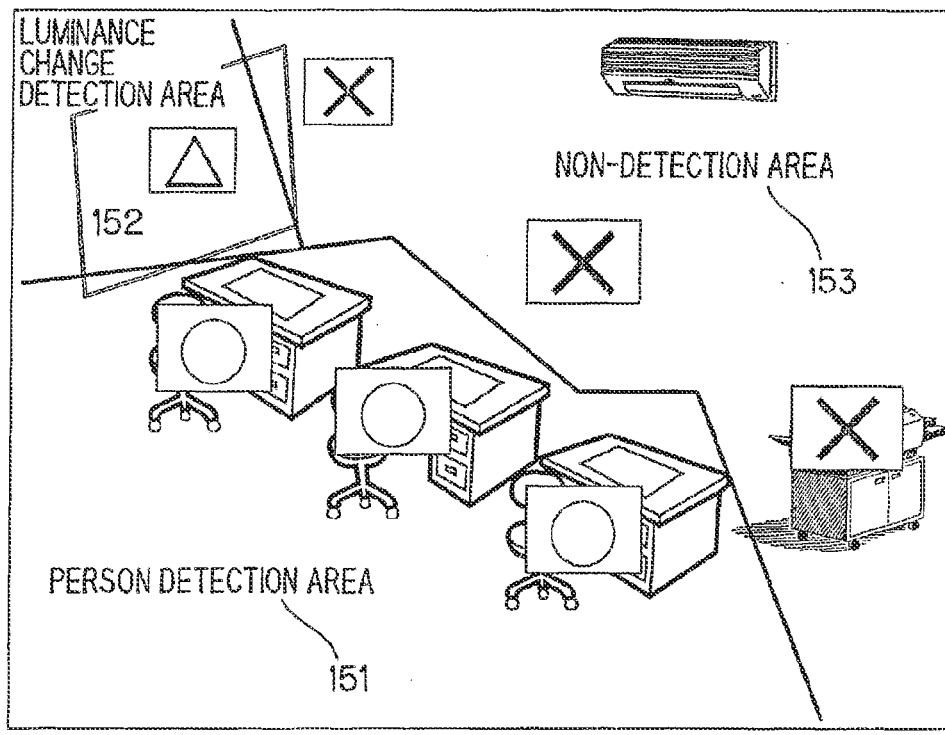
FIG. 15 is an image drawing in which the office is divided into three areas by markers.

As illustrated in FIG. 15, the dividing unit 14 divides the image acquired by the image acquiring unit 11 into three areas, namely, a person detection area 151, a luminance change detection area 152, and a non-detection area 153 on the basis of the marker acquired by the marker retaining unit 12.

Figure 16:
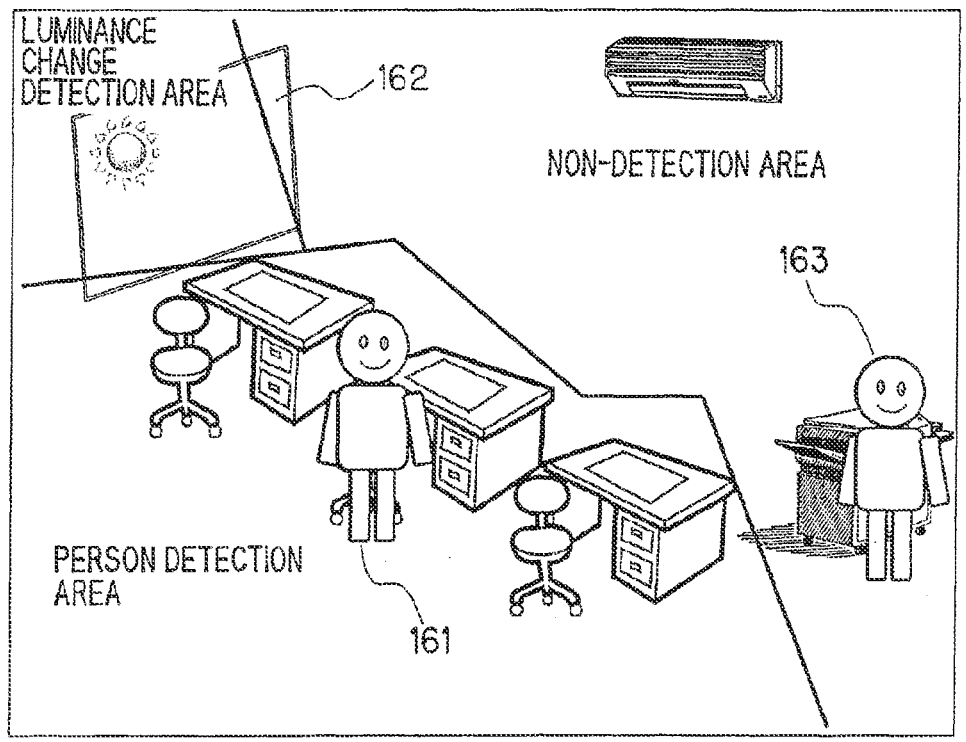
FIG. 16 is an image drawing in which the office is divided into three areas.

The processing unit 15 outputs the air-conditioning control signal to the air-conditioning control apparatus so as to strengthen the air conditioning of the air conditioner by detecting entry of a person 161 into the person detection area or a rising change 162 of luminance due to the sunshine in the luminance change detection area in the office divided into the three areas as illustrated in FIG. 16. In contrast, the processing unit 15 outputs the air-conditioning control signal for weakening or stopping the air conditioning of the air conditioner if the person 163 stands in front of the copying machine located in the non-detection area to the air-conditioning control apparatus.

As illustrated in the application example 3, the processing method in associated with the marker may be a processing method for detecting a change of the state such as a luminance change in addition to the processing method for detecting the presence or absence of the specific object such as a person or a vehicle.

Fourth Embodiment

In a fourth embodiment, an application example 4 of the image processing apparatus 10 described in the first embodiment will be described with reference to FIG. 17 to FIG. 24. The application example 4 is the case where when the area division on the basis of marker input is provided as a feedback and the worker confirms the result of the area division in the application example 3, and the worker finds that the input of a marker is insufficient, or a marker is placed at an erroneous position for input.

In other words, the image processing apparatus 10 performs the area division with the markers, there is a case where the area division differs from an intended result due to the erroneous input of the marker. Since the worker on site does not know whether the area division of the image is done as intended, a portable display apparatus such as a portable personal computer, a tablet terminal, or a smart phone is arranged on workers hand, and the image processing apparatus 10 provides a feedback the result of the area division to the portable display apparatus, whereby the worker can determine a positional correction or addition of the marker. Therefore, as illustrated in FIG. 17, the worker on site holds a portable display apparatus 171 in his or her hand, and the portable display apparatus 171 displays the result of the area division on the basis of the marker input until the current time.

Figure 17:
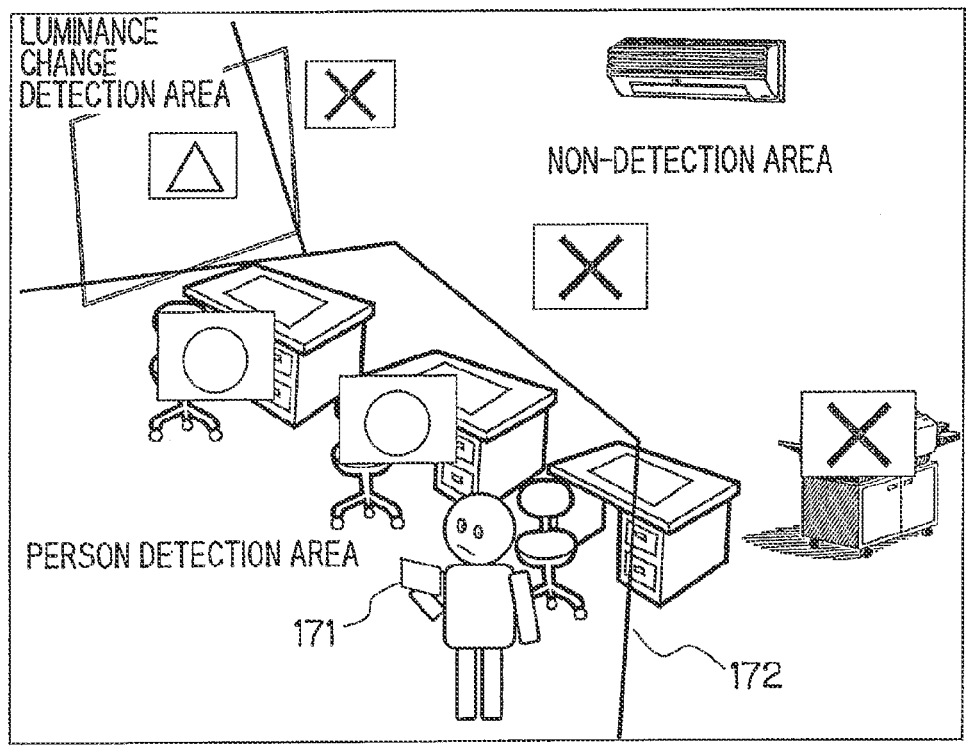
FIG. 17 is an image drawing in which a worker on site holds a portable display apparatus in his or her hand of an application example 4 of a fourth embodiment.
Figure 18:
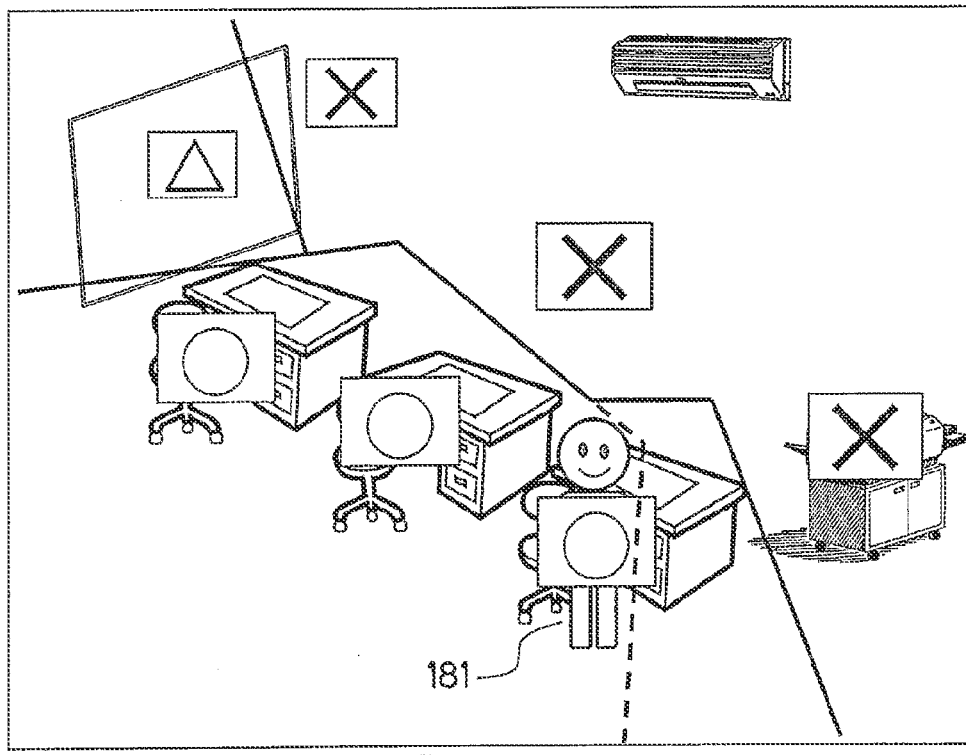
FIG. 18 is an image drawing in which the worker holds a circular marker at a required position and the camera 16 has shot an image thereof.

As a first example of the erroneous input includes the case where the worker forgets to input the circular marker to one position as illustrated in FIG. 18 and a boundary 172 is set at a wrong position as illustrated in FIG. 17.

At this time, by providing a feedback of the result of the area division to the worker, the worker holds a circular marker 181 at a required position and the camera 16 shoots the image as illustrated in FIG. 18, so that the worker is encouraged to divide the area correctly by the dividing unit 14.

Figure 19:
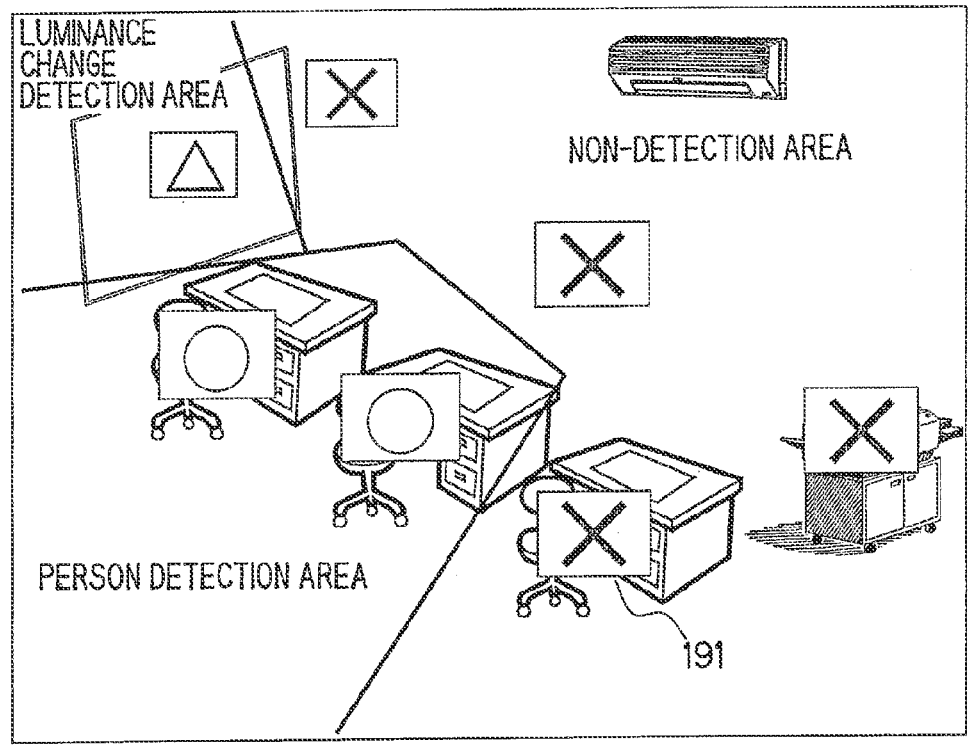
FIG. 19 is an image drawing in which the worker inputs cross marks at positions where circular marks are to be input.

A second example of the erroneous input is the case where the worker input a cross mark 191 to a position where the circle mark should be input as illustrated in FIG. 19.

At this time, the existing marker of the cross mark 191 needs to be deleted, the marker retaining unit 12 acquires a square marker specific for deleting process in associated with the processing method, "to delete an existing marker within a certain range from a position where the square marker appears in the image".

Figure 20:
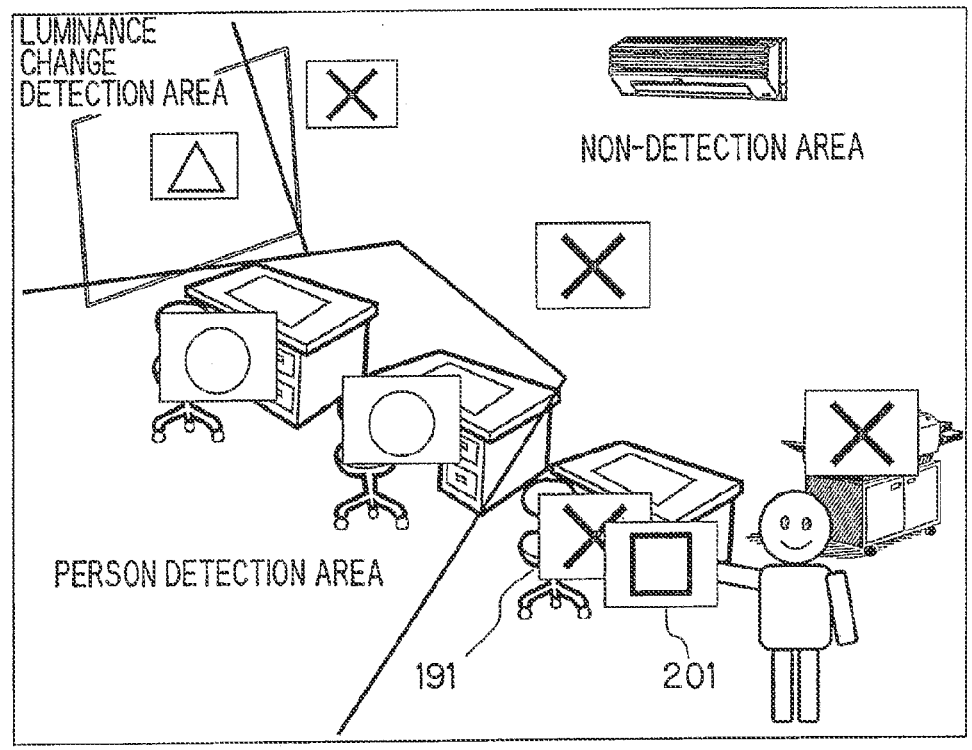
FIG. 20 is an image drawing in which the worker holds a square marker at a position close to an existing cross marker to be deleted.

Subsequently, as illustrated in FIG. 20, the worker waits for a square marker 201 at a position near the existing cross marker 191 to be deleted, and the camera 16 shoots the corresponding scene.

Figure 21:
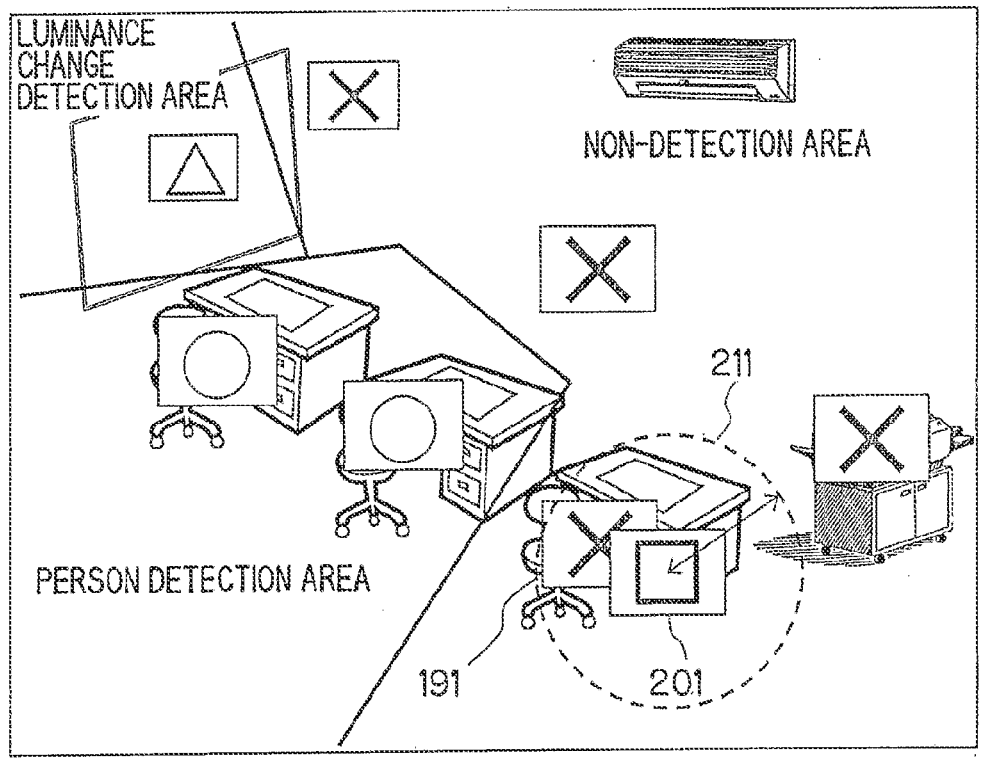
FIG. 21 is an image drawing in which cross markers inside a certain range is deleted from a position on the image in which a square marker is caught.

Subsequently, as illustrated in FIG. 21, the processing unit 15 deletes the cross marker 191 inside a certain range 211 from the position on the image having the square marker 201 appears thereon.

Figure 22:
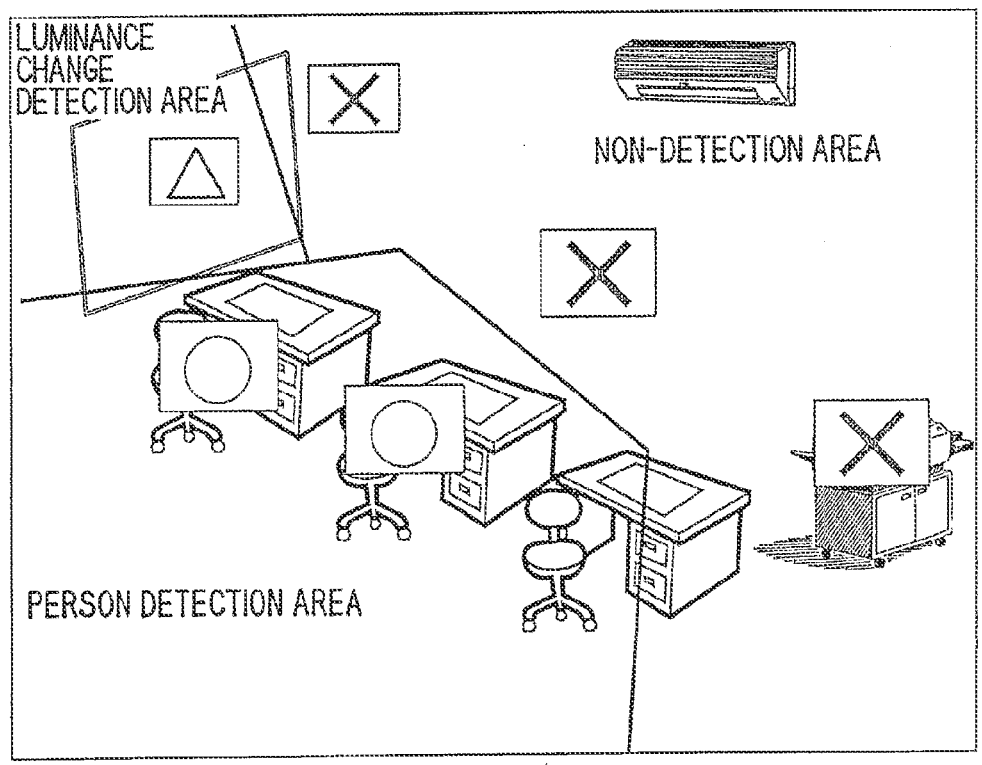
FIG. 22 is an image drawing in which a dividing unit divides the area of an image in which the cross marker is not present.

Subsequently, as illustrated in FIG. 22, the dividing unit 14 performs the area division of the image on which the cross marker 191 is not present.

Subsequently, as illustrated in FIG. 18, the camera 16 shoots the circular marker 181 thereafter again, and the image acquiring unit 11 acquires the image and the dividing unit 14 performs the area division on the corresponding image.

A third example of the erroneous input is a modification of the second example, in which a processing method "to delete the existing marker within the certain range from a position where the marker is shot on the image" is also added to all types of markers instead of the square marker specific for deleting process.

Figure 23:
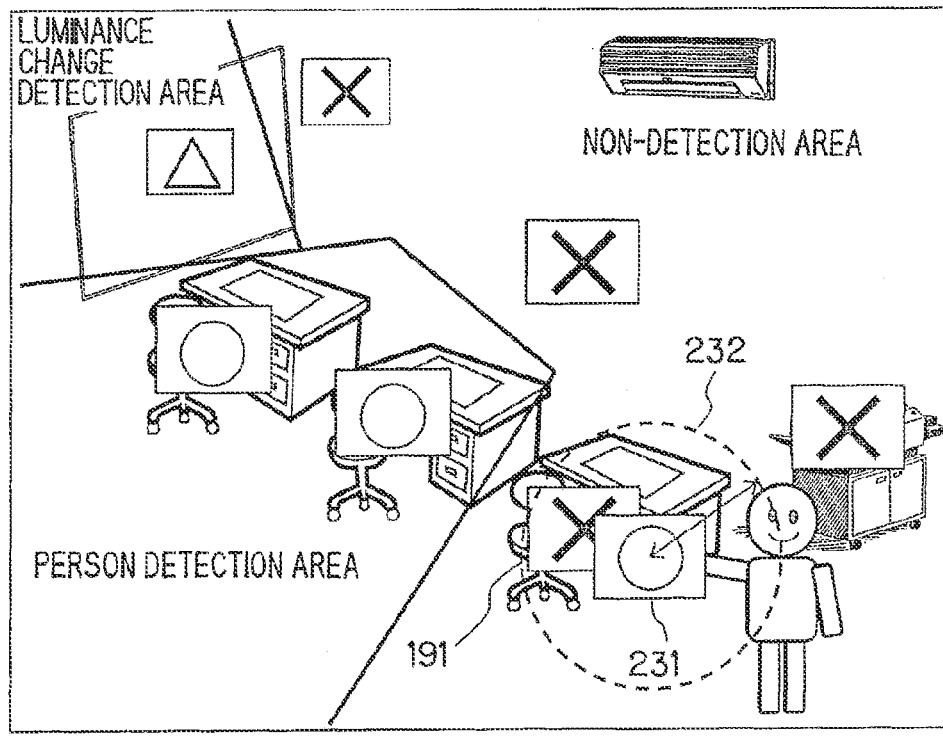
FIG. 23 is an image drawing in which the worker holds a circular marker applied with a delete processing method at a position close to a cross marker to be deleted.

As illustrated in FIG. 23, the worker holds a circular marker 231 including a delete processing method added thereto at a position close to the cross marker 191 to be deleted, and the camera 16 shoots the corresponding scene.

Subsequently, the processing unit 15 deletes the cross marker 191 inside a certain range 232 from the position on the image having the circular marker 231 shot and appeared thereon.

Figure 24:
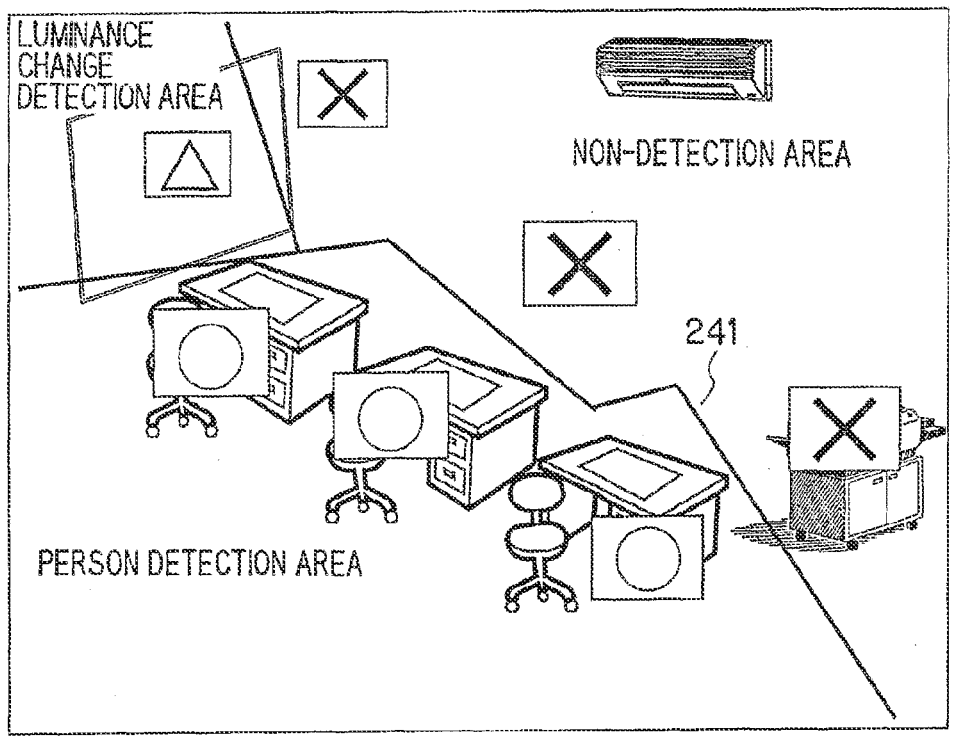
FIG. 24 is an image drawing in which the dividing unit sets a new boundary with reference to a circular marker.

Subsequently, as illustrated in FIG. 24, the dividing unit 14 sets a new boundary 241 with reference to the circular marker 231.

Modification

In the respective embodiments described above, the markers can be identified only by the shape such as the two-dimensional circle marks or cross marks presented on the board. However, the invention is not limited, and markers of different types may be formed by changing the pattern or the color.

In the respective embodiments described above, the marker is a two-dimensional shape presented on the board. However, the invention is not limited thereto, and a configuration in which the markers are displayed on a display of an information terminal such as a laptop personal computer and the worker displays these markers is also applicable.

Although the embodiments described above, the marker has a two-dimensional shape presented on the board. However, the invention is not limited thereto, and markers having a three-dimensional shape is also applicable. For example, the vehicle stopping in the parking may be used as the marker.

In the image processing apparatus 10, a CPU may read out an image processing program from a ROM onto a RAM and executes the program, so that the respective units (the image acquiring unit 11, the marker retaining unit 12, the detection unit 13, the dividing unit 14, and the processing unit 15) are realized on the computer, and the process described above is performed from an I/F by using data such as the markers memorized in an HDD. The image processing program may be memorized in the HDD. The image processing program may be memorized in a computer readable memory medium such as a CD-ROM, a CD-R, a memory card, a DVD, a flexible disk (FD), and an USB memory and provided in a file of an installable form or executable form. Alternatively, the image processing program may be provided by storing on a computer connected to network such as internet, and provided by causing the user to download via the network. The image processing program may be provided or distributed via the network such as internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   electronic storage configured to store marker information including a plurality of types of markers, each type of marker being distinguishable on a basis of one or more of shape, pattern or color; and
   computer processing circuitry configured to at least:
   acquire one or more images in which a plurality of markers is captured;
   detect types and positions of the markers captured in the image according to the marker information; and
   divide the image into a plurality of divided areas on a basis of the respective position of each type of marker in the image, so that each divided area includes one type of marker,
   wherein the marker information further includes a processing method corresponding to each type of marker, and
   the computer processing circuitry is further configured to execute the processing method corresponding to the type of marker in each divided area.

2. The image processing apparatus according to claim 1, wherein the processing method corresponding to the type of marker in a respective divided area detects a specific object from the respective divided area or detects a luminance change in the respective divided area.

3. The image processing apparatus according to claim 1, wherein the computer processing circuitry is further configured to obtain similarities of marker points where a plurality of markers are present on the image and a given point on the image, respectively, and to determine that the given point belongs to an area of the marker having the highest similarity.

4. The image processing apparatus according to claim 3, wherein the computer processing circuitry is further configured to use a distance or a geodesic distance between the position of the marker points and the position of the given point as a scale of the similarity.

5. The image processing apparatus according to claim 3, wherein the computer processing circuitry is further configured to use an amount of change in luminance value or an RGB value between the marker points and the given point as a scale of the similarity.

6. The image processing apparatus according to claim 3, wherein the computer processing circuitry is further configured to perform area division by graph-cut by using an edge weight of the given point as a scale of the similarity.

7. The image processing apparatus according to claim 3, wherein the computer processing circuitry is further configured to perform area division by Watershed method by using the position of the marker points and a luminance gradient of the given point as a scale of the similarity.

8. The image processing apparatus according to claim 3, wherein the computer processing circuitry is configured to change a scale of the similarity for each marker pair compared in the image.

9. The image processing apparatus according to claim 1, wherein the computer processing circuitry is configured to form a boundary line of the divided area and to display the divided area and the boundary line on a display.

10. The image processing apparatus according to claim 1, wherein the processing method corresponding to one type of marker deletes other markers present within a certain range of the one type of marker in the image and processes the deleted markers so as not to be used for division of the area.

11. The image processing apparatus according to claim 10, wherein the one type of marker is a marker type specific for a deleting process.

12. An image processing method comprising:
   storing, in electronic storage, marker information including a plurality of types of markers, each type of marker being distinguishable on the basis of one or more of shape, pattern or color;
   acquiring, by computer processing circuitry, one or more images in which a plurality of markers is captured;
   detecting, by the computer processing circuitry, the types and positions of the markers captured in the image according to the marker information; and
   dividing, by the computer processing circuitry, the image into a plurality of divided areas on the basis of the respective position of each type of marker in the image, so that each divided area includes one type of marker, wherein
   the marker information further includes a processing method corresponding to each type of marker, and the method further comprises
   executing, by the computer processing circuitry, the processing method corresponding to the type of marker in each divided area.

13. A program stored in a non-transitory computer readable recording medium, the program, when executed, causing a computer comprising computer processing circuitry to perform at least:
   acquiring one or more images in which a plurality of markers is captured;
   detecting types and positions of the markers captured in the image according to marker information stored in electronic storage accessible to the computer, the marker information including a plurality of types of markers, each type of marker being distinguishable on the basis of one or more of shape, pattern or color; and dividing the image into a plurality of divided areas on the basis of the respective position of each type of marker in the image, so that each divided area includes one type of marker, wherein the marker information further includes a processing method corresponding to each type of marker, and the program causes the computer to further perform executing the processing method corresponding to the type of marker in each divided area.

14. The apparatus according to claim 1, wherein each divided area includes one or more markers of the same type.

15. The apparatus according to claim 2, wherein, in the marker information, the type of the marker and the specific object which is detected are stored in the electronic storage in correspondence with each other.

16. The apparatus according to claim 2, wherein, in the marker information, the type of the marker is stored in the electronic storage in correspondence with an area where the specific object is detected or an area where the specific object is not detected.

17. The apparatus according to claim 1, wherein a boundary of the divided areas is located between markers of different types.

18. The apparatus according to claim 1, wherein markers of the same type are included in the same divided area.

19. The apparatus according to claim 1, wherein each divided area does not overlap any other divided area.

* * * * *